(12) United States Patent
Winders

(10) Patent No.: US 8,051,807 B2  
(45) Date of Patent: Nov. 8, 2011

(54) SOW CHUTE AND HOIST

(75) Inventor: Max Winders, Belle Plaine, MN (US)

(73) Assignee: Zinpro Corporation, Eden Prairie, MN (US)

( * ) Notice: Subject to any disclaimer, the term of this patent is extended or adjusted under 35 U.S.C. 154(b) by 640 days.

(21) Appl. No.: 12/015,539

(22) Filed: Jan. 17, 2008

(65) Prior Publication Data

US 2009/0183690 A1 Jul. 23, 2009

Related U.S. Application Data

(63) Continuation-in-part of application No. 11/686,183, filed on Mar. 14, 2007, now abandoned.

(51) Int. Cl.  
*A61D 3/00* (2006.01)

(52) U.S. Cl. .................. 119/728; 119/749

(58) Field of Classification Search ............. 119/728, 119/725, 726, 727, 738, 749, 751, 752, 712, 119/755

See application file for complete search history.

(56) References Cited

U.S. PATENT DOCUMENTS

| | | | | |
|---|---|---|---|---|
| 877,947 A * | 2/1908 | Pendleton | ...... | 119/726 |
| 1,234,733 A * | 7/1917 | Corington | ...... | 119/722 |
| 1,375,189 A * | 4/1921 | Tucker | ...... | 119/726 |
| 3,299,856 A * | 1/1967 | Fogle | ...... | 119/734 |
| 3,370,835 A * | 2/1968 | Crowson | ...... | 256/26 |
| 3,621,819 A * | 11/1971 | Hooper | ...... | 119/727 |
| 4,432,306 A * | 2/1984 | Rossa | ...... | 119/725 |
| 4,829,937 A * | 5/1989 | Weelink | ...... | 119/727 |
| 5,441,016 A * | 8/1995 | Ricketts | ...... | 119/723 |
| 2008/0223309 A1* | 9/2008 | Winders | ...... | 119/728 |

* cited by examiner

*Primary Examiner* — T. Nguyen  
(74) *Attorney, Agent, or Firm* — McKee, Vorhees & Sease, P.L.C.

(57) ABSTRACT

A vertically moveable immobilizing sow chute to allow hoisting and holding horizontally of a sow for foot treatment is described. The unit avoids the use of slings, can be operated electrically, and has numerous fail safe features as well as mobility and stability.

11 Claims, 9 Drawing Sheets

SOW CHUTE AND HOIST

CROSS-REFERENCE TO RELATED APPLICATIONS

This application is a Continuation-in-Part of commonly owned, application U.S. Ser. No. 11/686,183 filed Mar. 14, 2007, published Sep. 18, 2009, now abandoned in favor of this Continuation-in-Part Application, herein incorporated by reference in its entirety. The filing date is claimed pursuant to 35 U.S.C. §120.

FIELD OF THE INVENTION

This invention generally relates to an improved immobilizing sow chute to allow hoisting and horizontal holding of a sow for foot inspection and treatment. It avoids use of a flexible sling, and can be operated by a single operator. It represents an improvement over my earlier invention of U.S. Ser. No. 11/686,183 filed Mar. 14, 2007.

BACKGROUND OF THE INVENTION

Lifting devices for animals are generally known. In the most general sense, they often incorporate a winch having a cable attached thereto and some form of sling lifted by the winch to cradle the animal inside of the sling apparatus. While such lifting devices are generally described and known, there is a need for a very specific purpose lifting device, designed especially for sows to allow for foot inspection and treatment. Such a device presents unique problems. For example, an effective immobilizing sow chute must be 'sow friendly'. That is to say, the chute must be easy to enter, easy to exit, and causes no harm or alarm to the sow when she is restrained. An effective chute must prevent the sow from fighting, squealing, and kicking while her feet are inspected and/or treated. And the unit must be stable and safe when in the raised position.

Another special problem with sows is they are very heavy and that the hoist must allow hoisting of the animal in a manner that does not risk injury either to the animal's legs, shoulders, hips, or cause other internal injuries. Furthermore, the chute must present the sow in a manner which is safe for persons to inspect/treat the sow's feet. One way of avoiding injuries to the animal is to provide adequate support through the use of a sling, while maintaining the animal in a standing position during lifting. But slings per se have disadvantages such as difficulty in securing all four animal legs into the sling, danger of injury for workers while adjusting feet of the animal into the sling, agitation of some animals while harnessing the sling, risk of strap/apron failure, and danger of tangling with other parts of the device. They also require several workers to successfully operate.

Finally, an effective device to immobilize sows for foot examination must be one which can be operated by a single operator, because many times no one else is around. My earlier referred to application related to slings. As stated in some instances, it is desirable to avoid slings altogether.

While I have used slings successfully in the past for raising animals for foot inspection, they have some disadvantages as earlier mentioned and are disliked by some users. It would therefore be desirable to provide a non-sling option.

Another problem to be overcome by a successful chute is that it must have both mobility and stability. That is to say the unit must be easily moveable from place to place and at the same time, with the considerable weight of a sow within it when it is in up position it must be extremely stable.

Another problem with prior art chute units that have tried to go 100% electrical power is that they fail to have a backup system operable when there is an electric failure. This may be essential to getting a raised animal down.

Yet an additional problem with chute units which raise sows is that in the event of an electrical failure, there must be a stop system which will allow the operator to make sure that the animal does not fall from the elevated position to a lower position.

Finally, a special need for such units is that they must operate to provide maximum animal comfort and safety and the least amount of animal stress.

It is a primary object of the above invention to provide an immobilizing sow chute which can be entered from either end, which avoids the use of a sling, and which provides comfort, stability, and safety.

Another object of this invention is to provide an immobilizing sow chute which fulfills all of the above needs earlier described and which allows efficient operation by a single operator.

A still further object of the present invention is to provide a unit which has safety brakes to prevent the fall of a raised chute in the event of an electrical failure or hoist cable failure.

An additional object of the present invention is to provide a sow chute not only capable of entry from either end but which has contoured sidewalls to help support the animal's body for soft and relaxed holding of the sow.

An additional object of the present invention is to provide a highly mobile unit and a padded center pipe which the animal straddles until comfortably lifted off the ground.

The method and means of accomplishing each of the above objectives as well as others will become apparent from the detailed description of the invention which follows.

BRIEF SUMMARY OF THE INVENTION

A vertically moveable immobilizing sow chute to allow hoisting and holding horizontally of a sow especially for foot inspection and treatment but also for general inspection of the animal while it is restrained. The unit avoids the use of slings, can be operated electrically, and has numerous fail safe features as well as mobility and stability.

DETAILED DESCRIPTION OF THE PREFERRED EMBODIMENT

Figure 1:
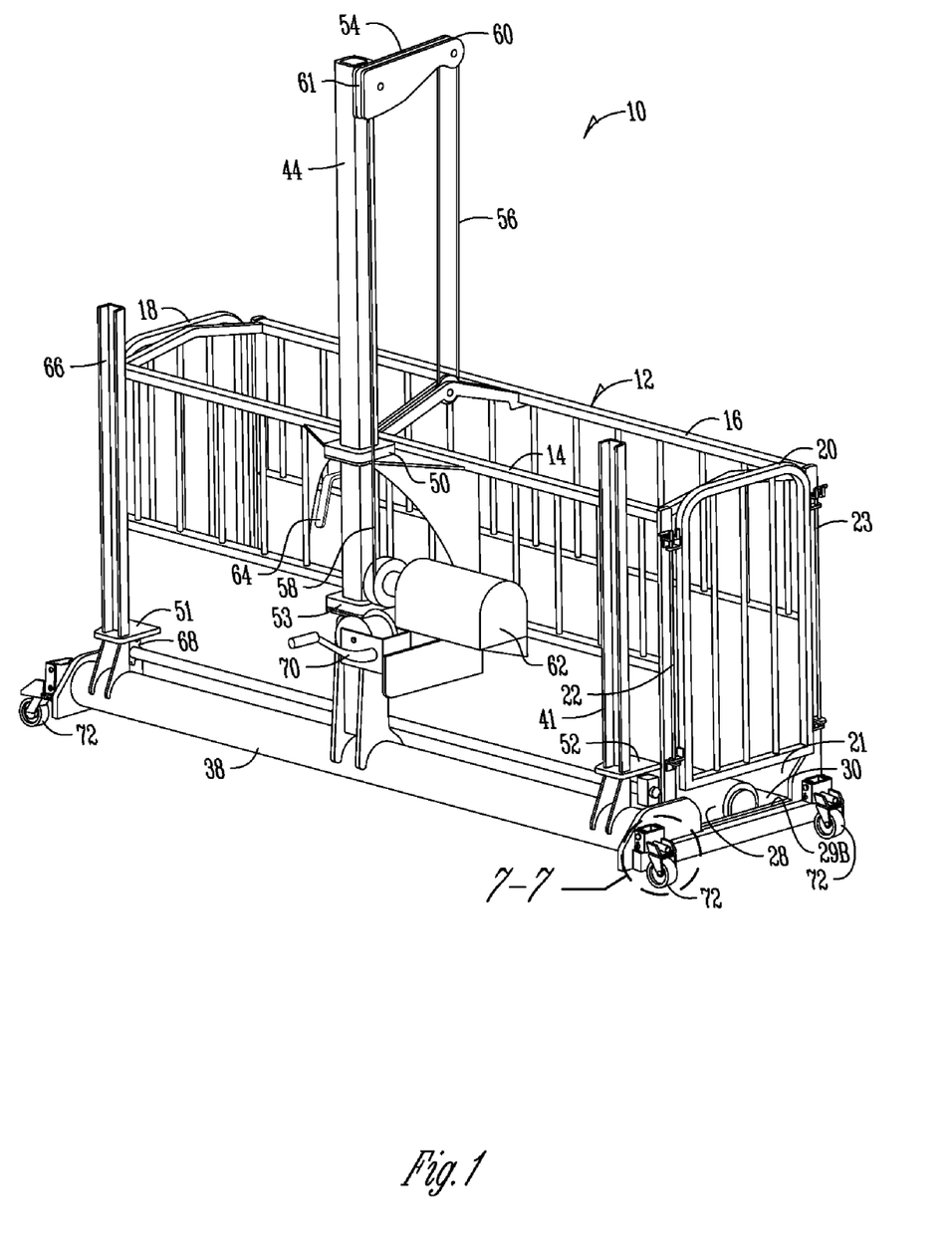
FIG. 1 is a perspective view of the immobilizing sow chute of the present invention with the chute down and immobile mode.
Figure 2:
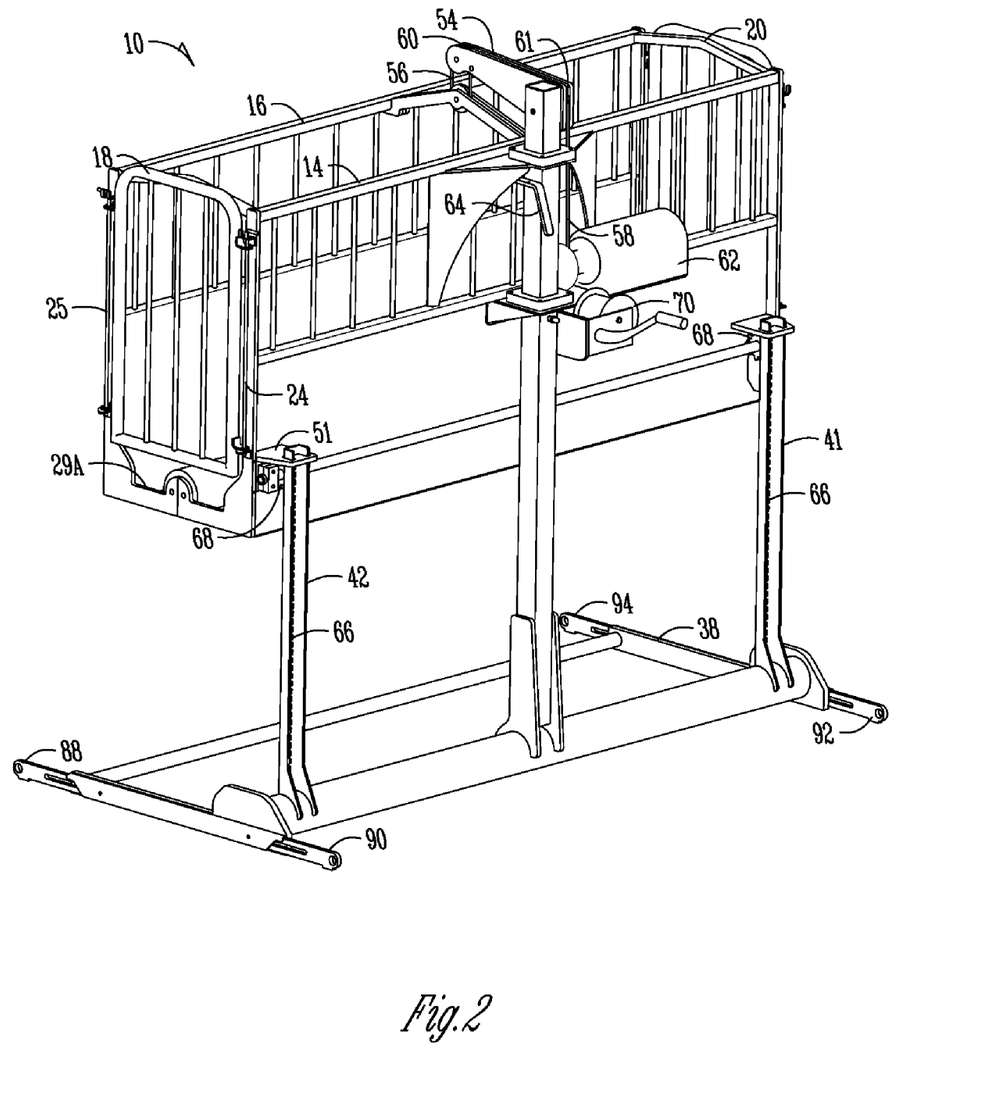
FIG. 2 is a side view of the chute of FIG. 1 from the side opposite the winch to better show the hoist bar.
Figure 3:
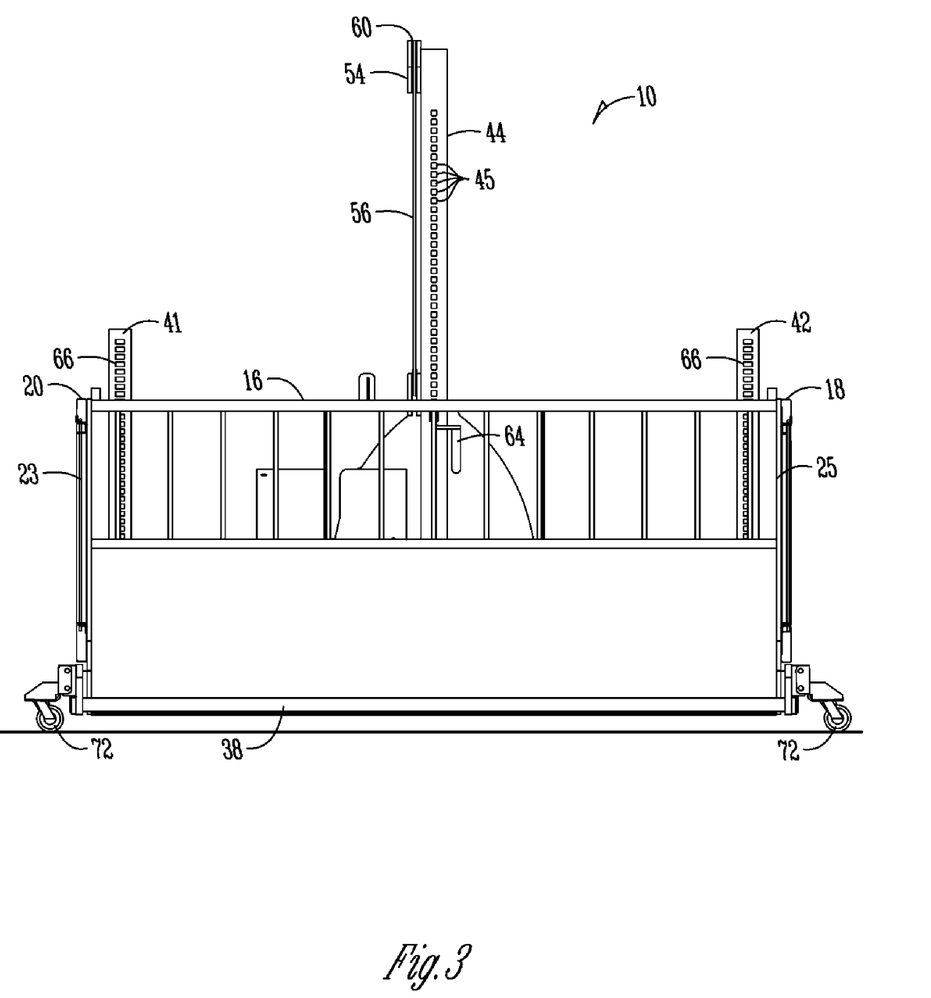
FIG. 3 is side view with the chute in lowered position.
Figure 4:
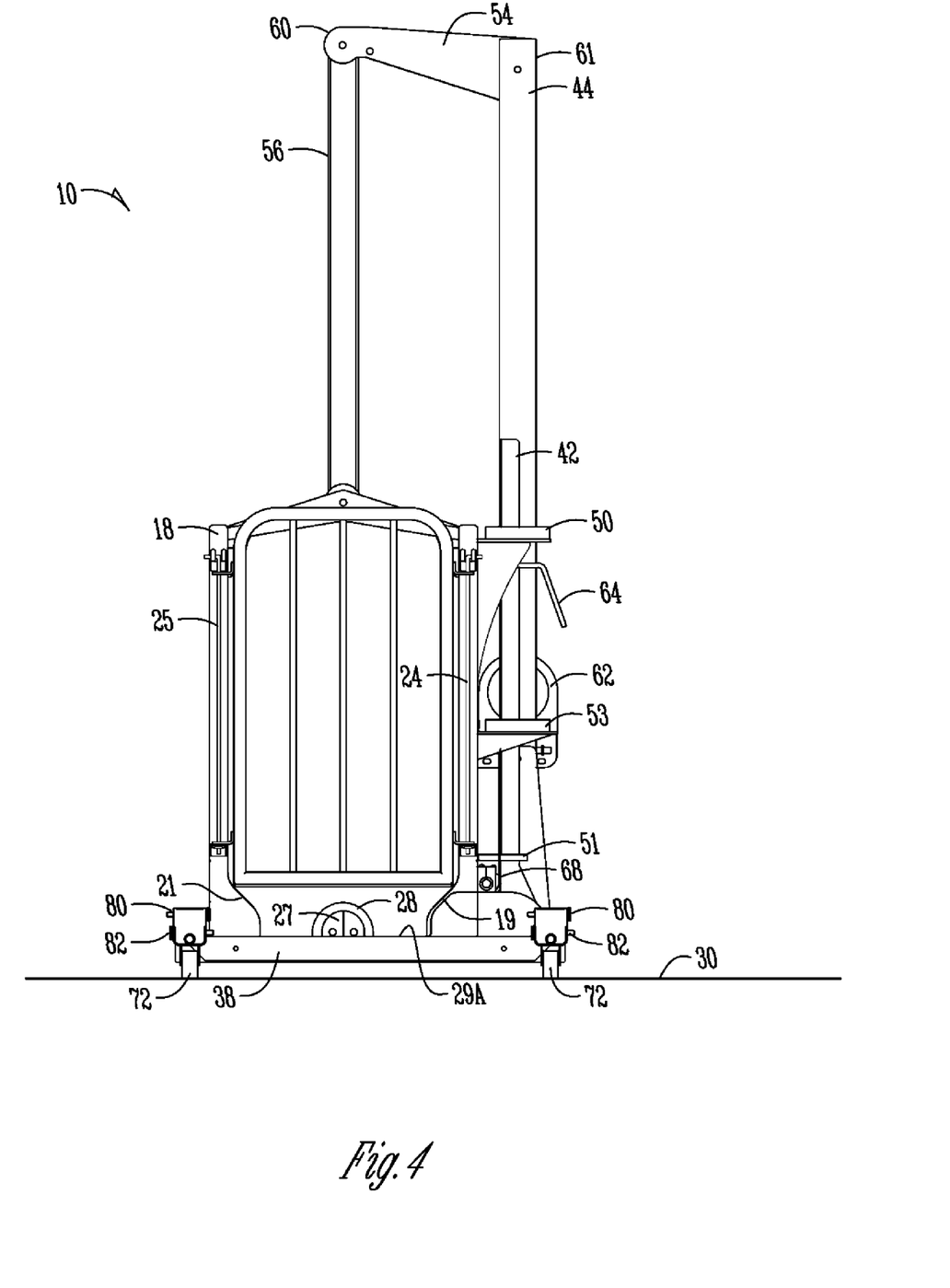
FIG. 4 is an end view of the immobilizing chute.
Figure 5:
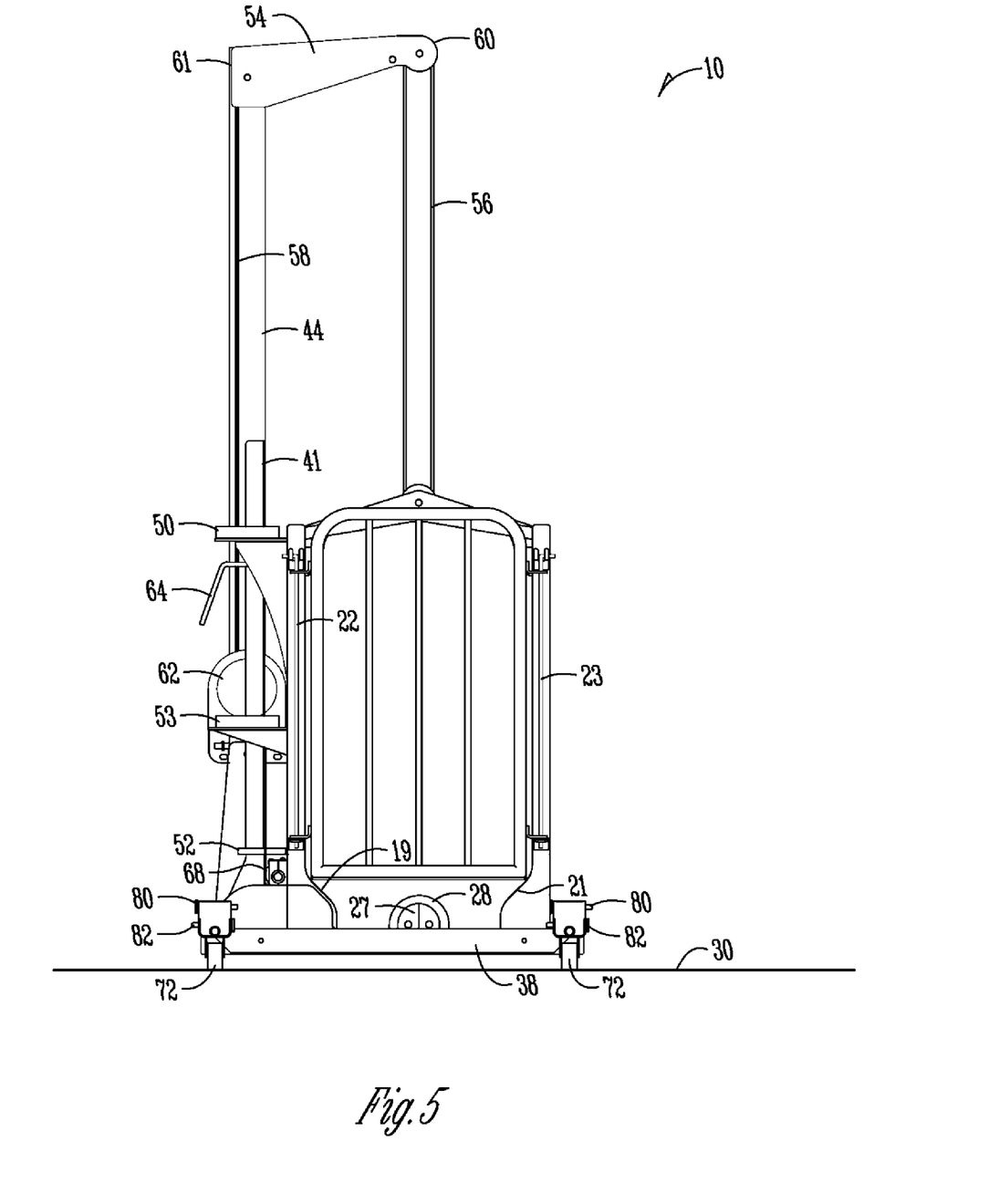
FIG. 5 is the opposite end view of the immobilizing chute.
Figure 6:
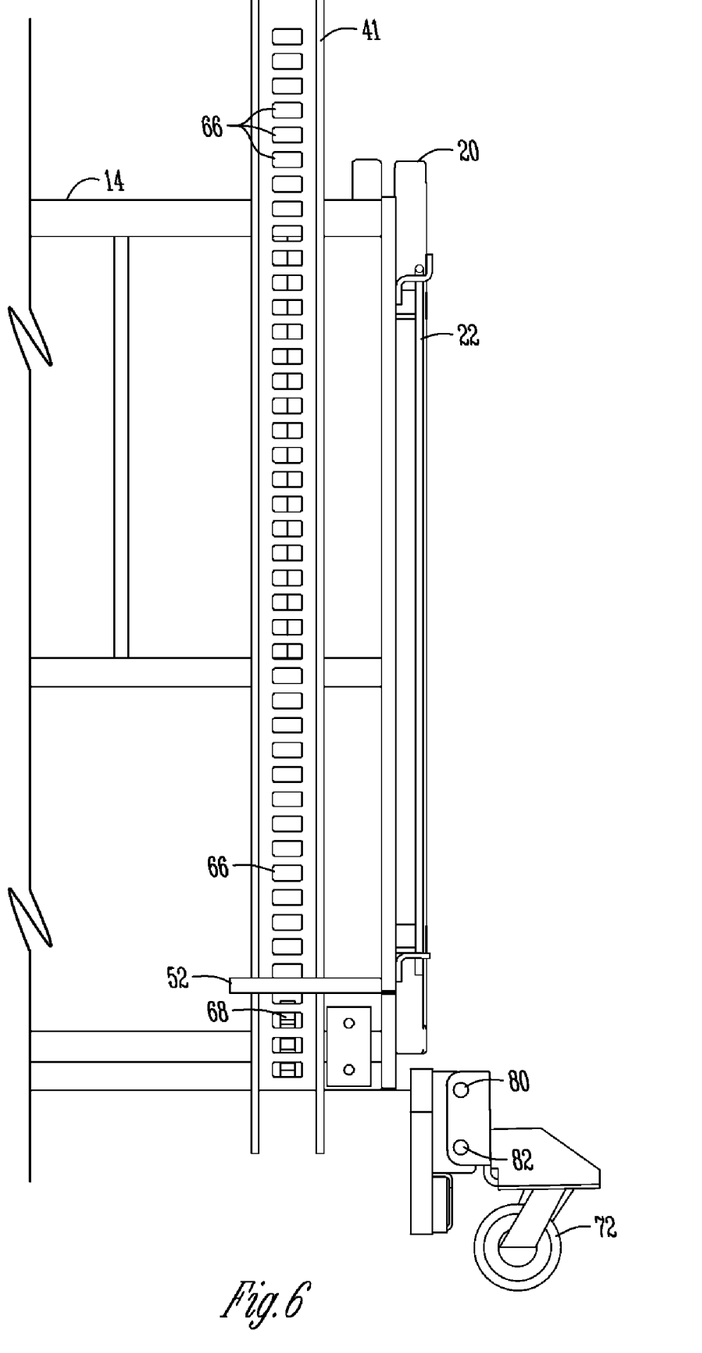
FIG. 6 shows a close up view of the vertical guide bar.

Referring to the drawings and initially to FIG. 1 there is shown an immobilizing chute 10 comprised of a cage or frame 12, in itself defined by opposing sides 14 and 16 and gate ends 18 and 20. As perhaps best shown in FIG. 5, gates 18 and 20 are pivotally mounted via hinge bars 22, 23, 24 and 25 to allow easy open and close entrance or egress from either end and either side of ends 18 and 20. The sides 14 and 16 (see FIG. 5) are each comprised of a vertically partially solid extending wall portion 18 and 20 with a shoulder 19, 21. The bottom of cage or frame 12 is comprised of opposite end bars 29A and 29B and a mid position longitudinally extending horizontal support bar 27 generally rounded in configured and covered with soft padding 28. Thus, it can be seen that an animal can enter from either end and stand on the floor 30 as shown in FIG. 5. If the cage frame 12 is raised the under belly of the sow will be supported on soft pad 28 of central support bar 27 and the animal side and shoulders are supported by the shoulders 19 and 20 of side walls 14 and 16. Gate ends 18 and 20 are pivotally attached on either side so that the gates can swing open both ways at the convenience of the user. The gate latches are conventional spring loaded handles 30 and rod assembly 32 to form the pivot hinges. Springs 34 and 36 engage latch handles 30.

The chute frame 12 is mounted within chute frame stand 38. Stand 38 is rectangle in shape and has rounded and elongated frame bar 40 and vertically oriented guide bars 41 and 42 at opposite ends. Located midway the ends of elongated frame bar 40 is vertical hoist bar 44. Vertical hoist bar 44 and vertical guide bars 41 and 42 are vertically slidably attached via brackets 50, 51, 52 and 53 to chute frame 12. In this way, chute frame 12 can be vertically raised and lowered by sliding up and down vertical guide bars 41, 42 and hoist bar 44.

At the top of vertical hoist bar 44 is lift arm pulley system generally defined at 54 with lift cables 58 and 60 on pulleys 60 and 61.

Conventional electrically driven winch 62 is attached to cables 56 and 58 so that it may be electrical power driven to raise and lower as the winch cables 56 and 58 wind and unwind. As the winch wind cables 56 and 58 tighten, the cage 12 is lifted upward on the vertical guide bars 41 and 42 and central support guide bar 44. The vertical hoist bar 44 has notches 45 at regular intervals which catch or engage a primary brake system 64 which automatically engages as chute 12 travels upward. Spring biasing means 65 of safety brake 64 catches and fits into the notches 45 and bumps from one to the other as cage 12 rises so that if the steel cables 56 and 58 would break, the sow in the chute 12 would be caught as the falling cage 12 engages the notches 45, preventing the animal from a crash fall. Vertical guide bars 41 and 42 at notches 66 engage wheel sprockets 68, 70 and rotate into each notch as the chute 12 travels upward and downward. This allows chute 12 to travel evenly and perpendicular to the ground.

Hand winch 70 is also mounted to centrally positioned vertical hoist bar 44 so that it can be selectively used in the event that the electrical winch 62 fails.

Figure 7:
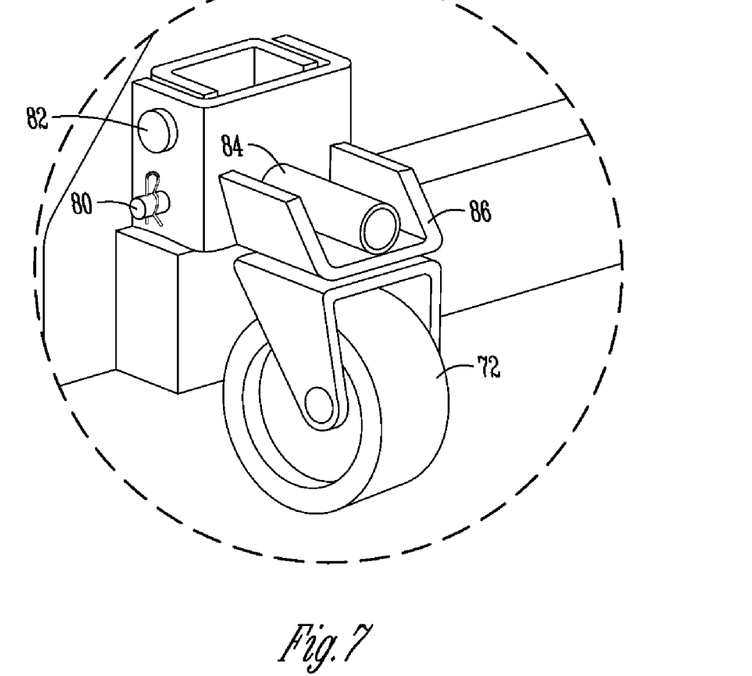
FIG. 7 shows an end view with the casters down in the mobile mode.
Figure 8:
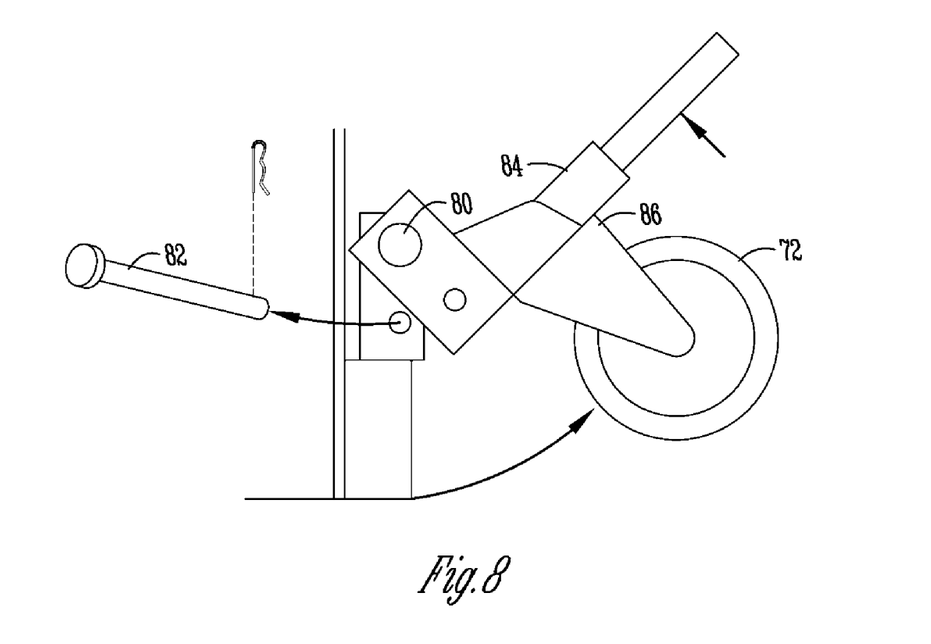
FIG. 8 shows the casters raised so that the immobilizing chute may rest on the floor.
Figure 9:
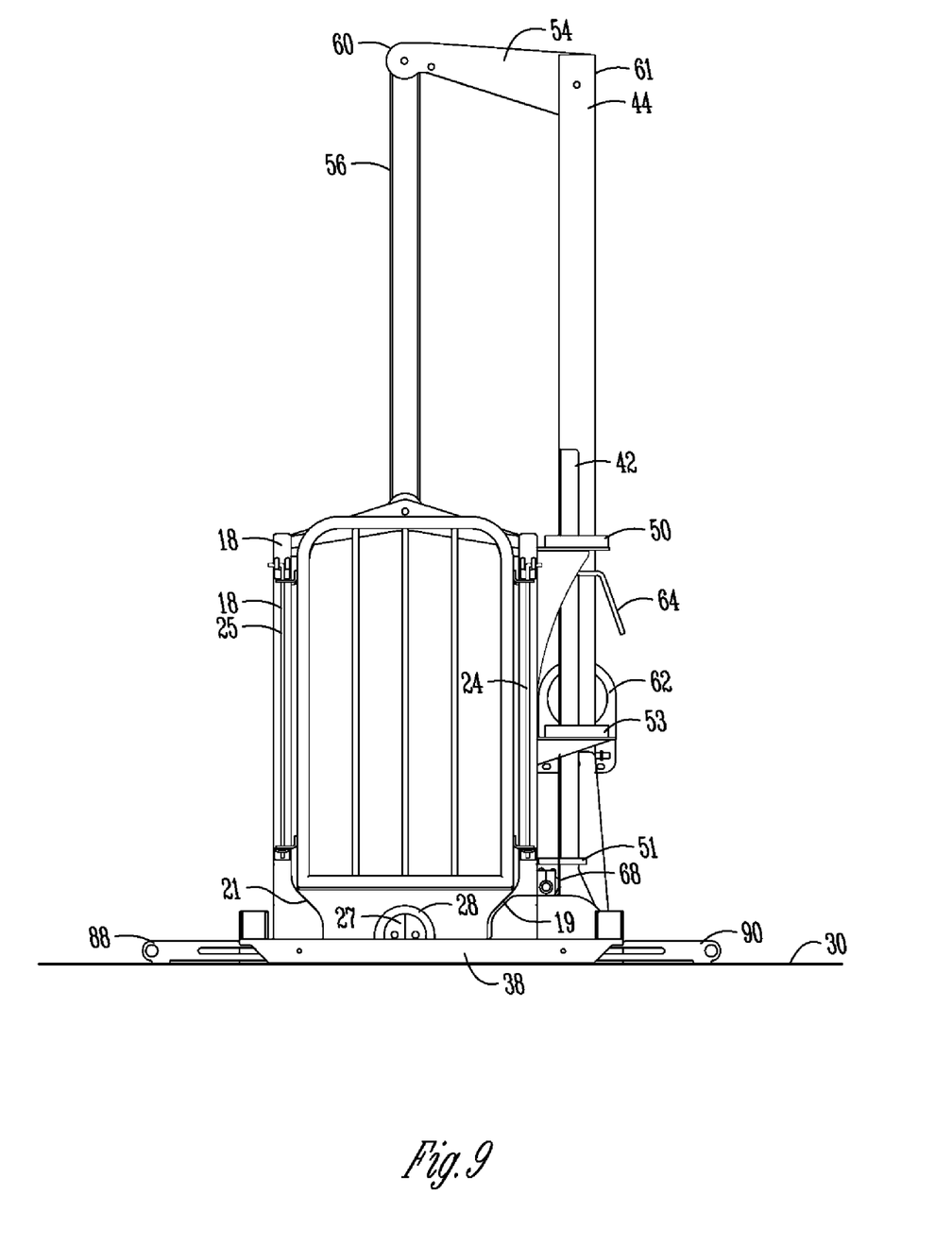
FIG. 9 shows the casters raised and the retractable stabilizer bars out.

The chute frame 38 is capable of resting on the floor 30 selectively or on attached casters 72, 74, 76 and 78 at the corners of each end. As best seen in FIG. 7, casters 72, 74, 76 and 78 are attached to the frame 38 at the respective corners via connecting pins 80 and 82 with each caster having a jack pipe 84. If it is desired for the unit to rest on the ground, pin 80 is removed, a jack 86 is inserted into jack pipe 84, as illustrated in FIG. 8, jack 86 and the caster wheels 72, 74, 76 and 78 are raised. This allows the unit to rest on the ground 30. Retractable stabilizer bars 88, 90, 92 and 94 slide outwardly as illustrated in FIG. 9 to stabilize the unit in ground engaging position. When it is desired to make the unit mobile, stabilizing bars 88, 90, 92 and 94 can slide inward along elongated slot 96 to their closed or retracted position, the casters are then lowered to ground engaging position and the unit can be moved to a new location.

Figure 10:
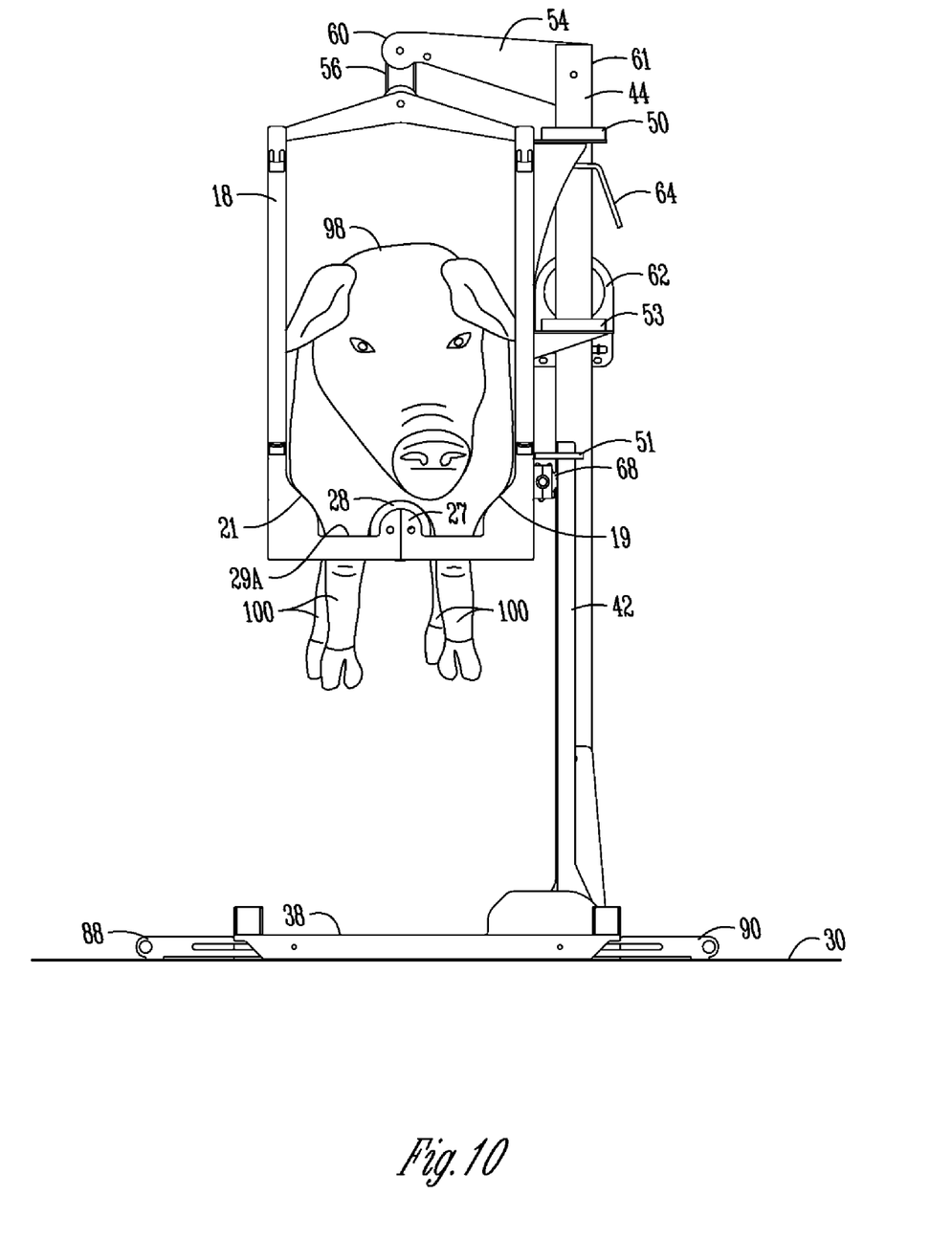
FIG. 10 shows an animal in raised position, with the casters off and in a stabilized mode with the stabilizer bars out.

FIG. 10 shows the unit in actual operation with the sow 98 in the chute. It is partially elevated midway between the raised and lowered positions. It can be seen the stabilizing bars 88, 90, 92 and 94 are out in ground 30 engaging position. The animal 98 is in contact with the central horizontal support bar 27 and pad 28, and is engaging its under belly; its sides comfortably rest on shoulders end 19 and 21. The animal's feet 100 protrude down out from the bottom so that they can be treated. The winch 12 after the animal's treatment can be engaged to lower the cage to ground 30 engaging position and either one of the gates 18 or 20 opened to allow the sow to exit.

It can be seen that no sling is needed, the unit is stable, it can be operated by a single person, and has many safety, stability and mobility features heretofore not achievable. In this way, the invention accomplishes at least all of its stated objectives.

What is claimed is:

1. A vertically moveable chute within a chute frame said chute being moveable between an up position and a down position,
    said chute having an entrance end, an exit end, and a bottom portion that allows an animal in the chute to stand on the ground when the chute is in down position;
    said bottom portion having a longitudinally oriented center support, engaging an animal's underbelly along its longitudinal axis in the direction from head to tail as the chute moves from down position to an up position within the chute frame and a pair of longitudinally extending opposing spaced apart side walls, shaped to conform to the body of an animal along its longitudinal axis in the direction from head to tail when; and
    power means operably connected to said chute frame and chute for raising and lowering said chute frame and any animal within the chute frame.

2. The chute and chute frame of claim 1 wherein the longitudinally oriented center support is an elongated bar covered with a soft cushioning cover for contact with an animal's underside.

3. The chute and chute frame of claim 1 wherein the power means is a motor driven winch.

4. The chute and chute frame of claim 3 which has a back up hand winch attached to it for use if the motor driven winch fails.

5. The chute and chute frame of claim 1 which has an attached vertical hoist bar for lifting the chute attached to the chute frame.

6. The chute and chute frame of claim 5 wherein the vertical hoist bar has a safety brake to prevent the raised chute from falling.

7. The chute and chute frame of claim 1 which has up/down moveable casters attached to the bottom portion of said chute frame for rolling the chute frame when the chute is down, and for allowing it to rest on the ground when the chute is up.

8. The chute and chute frame of claim 7 wherein the casters each have a jack holder for raising and lowering.

9. The chute and chute frame of claim 1 wherein the chute frame has retractable stabilizer bars attached to the bottom portion of said chute frame.

10. The chute and chute frame of claim 1 wherein the chute at its entrance end and exit end has hinged gates.

11. The chute and chute frame of claim 10 wherein the hinged gates can be selectively opened from either side.

* * * * *